United States Patent [19]
Witzel

[11] Patent Number: 4,895,210
[45] Date of Patent: Jan. 23, 1990

[54] CLUTCH-BRAKE STEERING FOR SMALL AGRICULTURAL MACHINES

[76] Inventor: Homer D. Witzel, 1700 Gulf Blvd., Englewood, Fla. 34223

[21] Appl. No.: 282,524

[22] Filed: Dec. 12, 1988

[51] Int. Cl.⁴ .................... A01B 33/08; A01B 69/00
[52] U.S. Cl. .................... 172/256; 172/125; 172/42; 180/6.2; 192/12 R
[58] Field of Search ............ 172/41, 42, 43, 125, 172/256, 35, 105, 106, 116, 123; 192/102, 12 R, 17 R; 180/6.2, 6.24, 6.26, 6.4

[56] References Cited

U.S. PATENT DOCUMENTS

| | | | |
|---|---|---|---|
| 2,015,587 | 9/1935 | Bready | 172/256 |
| 2,450,749 | 10/1948 | Clark | 172/256 X |
| 2,461,391 | 2/1949 | Osterhaus | 172/256 X |
| 2,757,373 | 7/1956 | Marrie | 180/6.2 |
| 3,016,957 | 1/1962 | Olson | 172/42 |
| 3,679,015 | 7/1972 | Shriver | 180/6.2 |
| 3,811,524 | 5/1974 | Aldred | 180/6.2 |
| 4,144,944 | 3/1979 | Aplin, Sr. | 180/6.2 |
| 4,519,459 | 5/1985 | Reaume | 172/42 |
| 4,669,590 | 6/1987 | Zindler et al. | 192/17 R |
| 4,696,381 | 9/1987 | Johnson, Sr. | 192/102 |

OTHER PUBLICATIONS

"The 1985 Troy-Built Roto Tiller catalog", Garden Way Manufacturing Co., Oct. 1985, pp. 4, 7, 10 and 18.
BCS Model 735 Sales Brochure, BCS Mosa Inc., May 1984.

Primary Examiner—Randolph A. Reese
Assistant Examiner—Jeffrey L. Thompson
Attorney, Agent, or Firm—Henderson & Sturm

[57] ABSTRACT

The type of machine in which the invention finds maximum utility is the self-propelled, user-guided garden machine such as a rotary tiller. A typical machine of that genre has a straight-through axle without a differential and opposite ends of the axle project as right and left shafts to which right and left ground-engaging wheels are respectively affixed. The improvement provided by the present invention resides in right and left clutch-brake units arranged symmetrically at each side of and external to the transmission case. The keys normally fixing the wheels to their shafts are removed and the wheels are instead journalled on the respective shafts and the clutches are alternately engaged and disengaged between the shafts and wheels to facilitate steering of the machine. Each clutching unit includes a brake and controls are provided for effecting braking and clutch disengagement at either side of the machine.

17 Claims, 5 Drawing Sheets

CLUTCH-BRAKE STEERING FOR SMALL AGRICULTURAL MACHINES

BACKGROUND AND SUMMARY OF THE INVENTION

The usual agricultural or garden machine, especially in the relatively low horsepower range of say, six to eight H.P. is economically designed and simplified to the extent that costly "frills" are eliminated and the power axle is simply of the straight through type; i.e., it has no differential. Consequently, although straight-ahead operation is fairly easy, problems occur when the machine is user-guided around corners, since the machine is relatively heavy (200–450 lbs) and is equipped with aggressive tires and the drive tends to keep the machine straight ahead and it must be manhandled on turns, often a difficult task in tough solids, for example.

Machines of higher horsepower and more expensive construction are equipped with internal steering clutches, usually in combination with differentially connected right and left axles. See, for example, U.S. Pat. No. 3,016,957 to Olson. Thus the steering problems encountered in the use of small, less expensive machines are not encountered.

According to the present invention, the improved system of steering by clutching and braking can be provided either as an after-market expedient or as a factory-installed option, in either case significantly improving the operation of the machine. Also in either case, the design is relatively simple and low-cost. In the after-market version, the units are simple, reliable and can be added to an existing machine with a minimum of alterations in the machine. For controls, operation of the clutches and brakes is via the usual handlebars, in one version effected by swinging the handlebars about the typical pivot provided on the machines for adjusting the lateral position of the handlebars. In other instances, the controls may be of the so-called bicycle type comprising levers arranged conveniently to the user.

The clutch-brake units are symmetrically arranged at opposite sides of the basic transmission casing. The relation between each clutch and brake is that each clutch is normally biased to engagement but is released by retarding the proximate or associated brake.

The system provided by the present invention is aimed primarily at improvements in machines of the six to eight horsepower range manufactured by The Garden Way Mfg. Co. of Troy, N.Y.; although, the system can be easily applied to machines of other manufacture and other types as to nature of work performed; e.g., mowing, plowing, snow plowing, etc.

Features and advantages of the invention will become apparent as a preferred embodiment is disclosed in the ensuing description and accompanying sheets of drawings.

DETAILED DESCRIPTION OF THE PREFERRED EMBODIMENT OF THE INVENTION

The machine selected for the purposes of disclosure is a Garden Way 6 H.P. "Horse"; although, as already noted, the invention has wider application. Throughout the description and in the claims, the terms "right" and "left" are used with reference to an observer standing behind the machine and looking forwardly. Further, these terms are used by way of convenience and not limitation.

Figure 1:
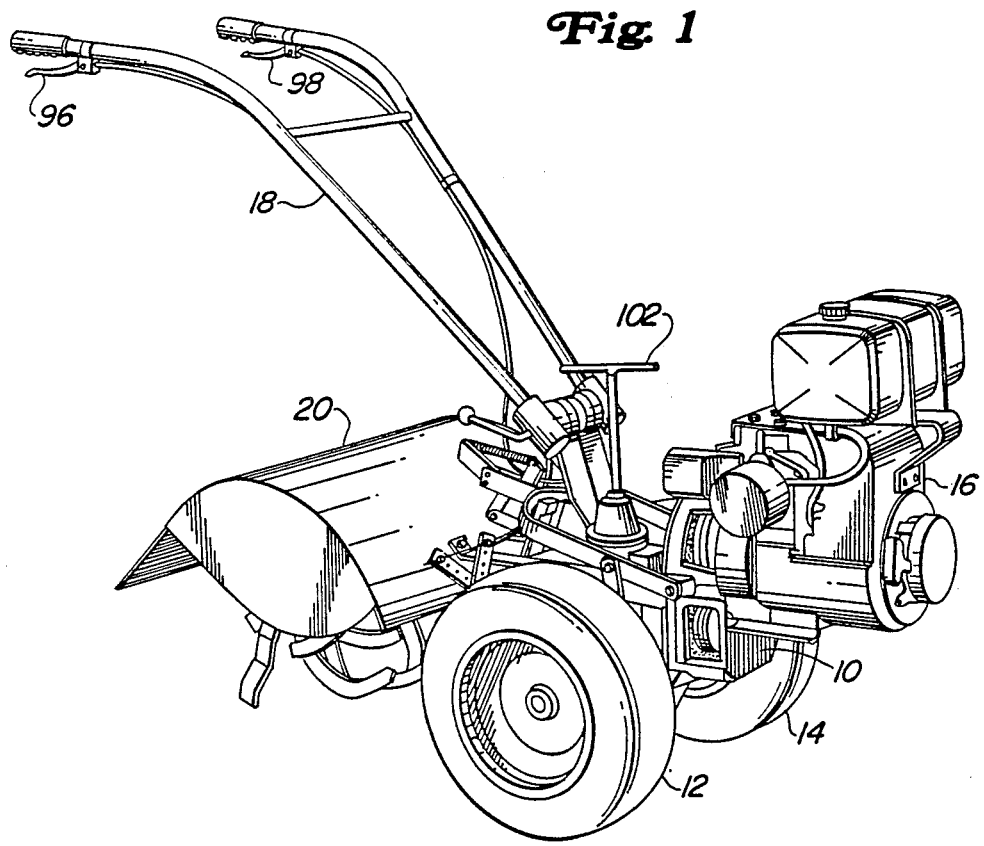
FIG. 1 is a perspective of a representative machine of the self-propelled tiller type.
Figure 2:
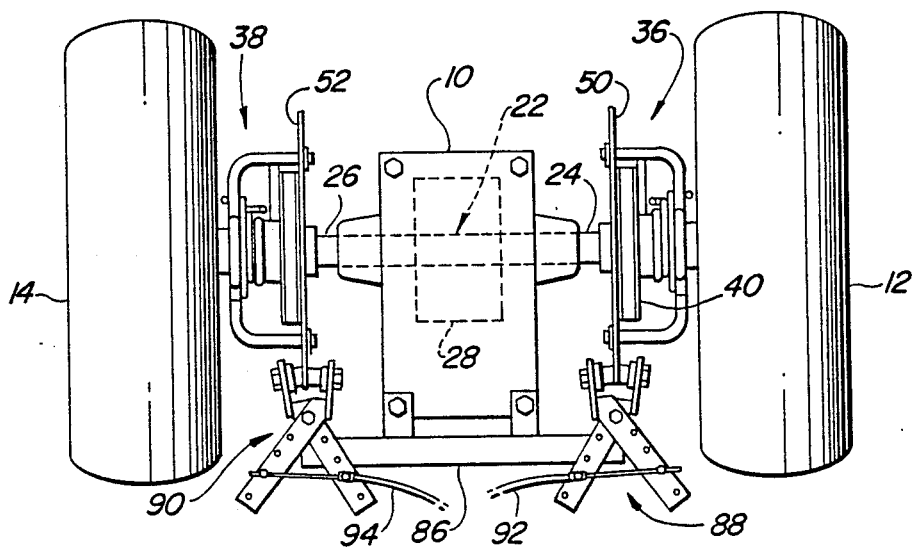
FIG. 2 is a rear view, on an enlarged scale, of the machine of FIG. 1, showing one form of brake control.

The machine, as best seen in FIG. 1, has a main body in the form of a transmission case (10) carried by right and left ground-engaging wheels (12) and (14), respectively. The machine is powered by an internal-combustion engine (16) and is guided by a user or walking attendant via typical handlebars (18). A tiller (20) of known design is carried by the body rearwardly of the drive wheels and just below the handlebars. As already noted, a machine of this character has a transverse, straight-through axle structure (22) which extends at opposite sides of the transmission case as right and left drive shafts (24) and (26). The dotted rectangle (28) in FIG. 2 represents internal transmission spur gearing of known type and is not shown or described in detail because of the many differences in change-speed gearing among machines of different makes and models. In any event, the right and left shafts are driven by the transmission without a differential; hence, the use of the term "straight through". The two shafts are often referred to as being part of a common transverse axle.

In a conventional machine of the kind disclosed, the wheels are keyed or otherwise affixed to rotate with and by the axle structure. Stated otherwise, the right and left shafts are coaxially interconnected to rotate positively and constantly in unison. In the known machine, this arrangement drives the machine straight ahead, guided by the attendant walking behind. Corners are turned, and other deviations from a straight-ahead path effected, by brute strength or manhandling, often more strenuous than can be easily accommodated, especially by attendants of less than normal strength.

Figure 4:
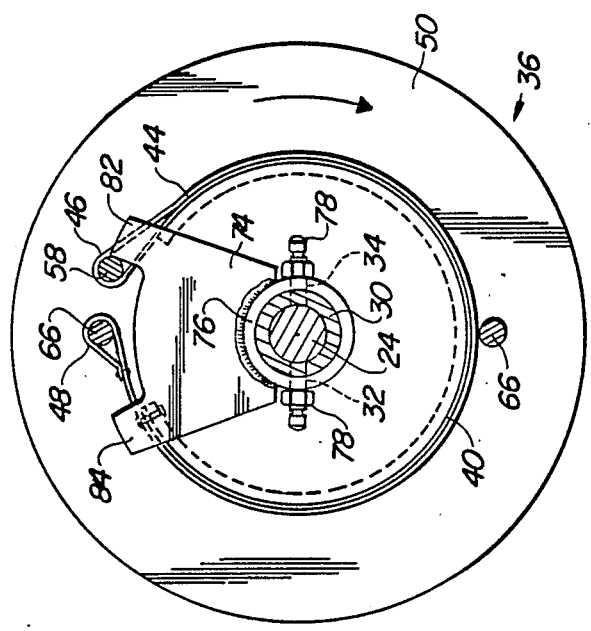
FIG. 4 is a section on the line 4—4 of FIG. 3.
Figure 5:
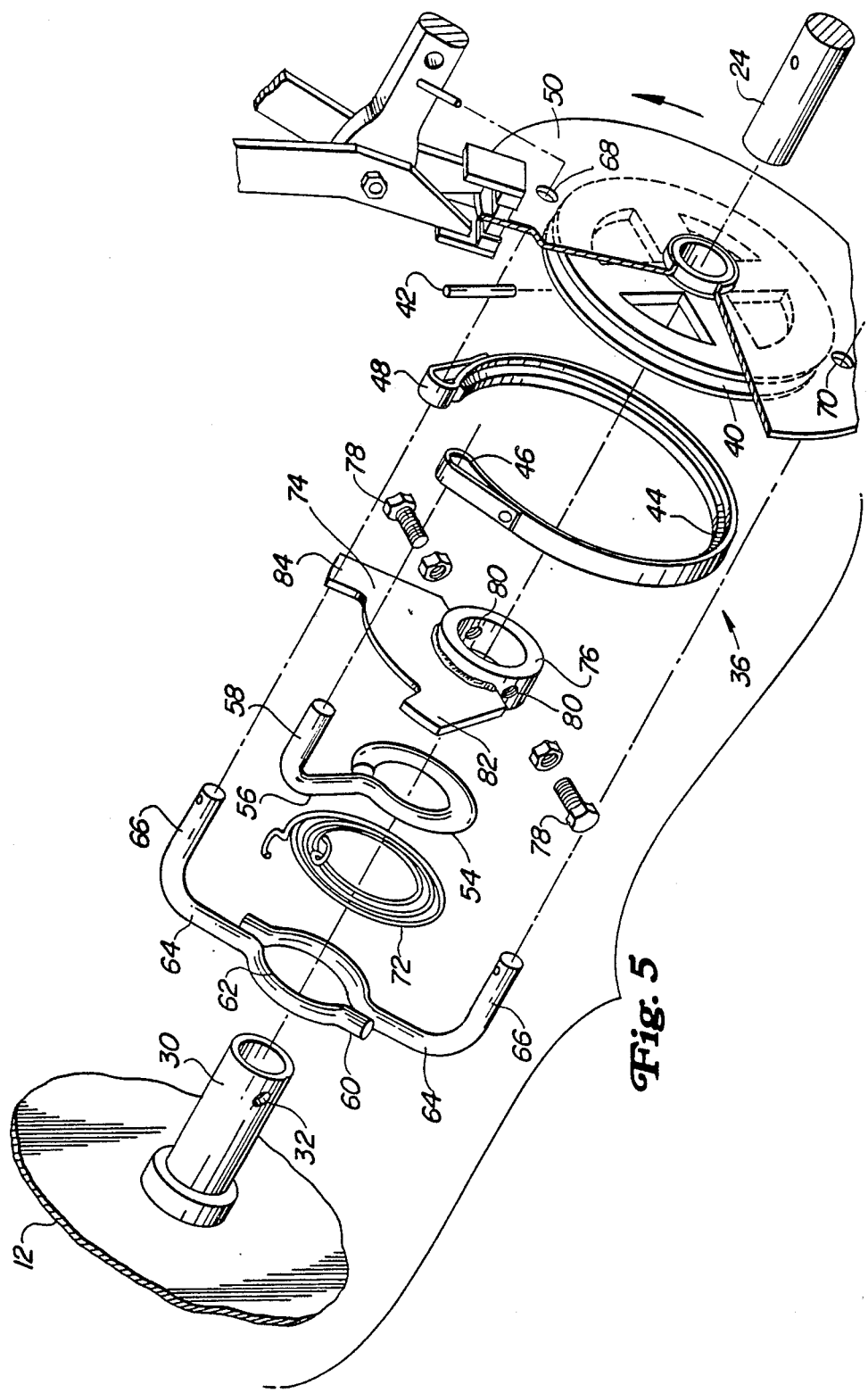
FIG. 5 is an "exploded" perspective on a larger scale and shows the disassembled relationship among the parts.

The initial step in converting the machine drive from positive or keyed shaft-to-wheel arrangement is to remove the wheels by removing the connecting pins or keys so that the wheels, when replaced on their respective shafts are separately journalled on those shafts, as by means of the wheel hubs which remain unchanged. The hub for the right wheel appears at (30) in FIG. 5. The left wheel has a similar hub, not shown in detail, but, since the wheels and steering units to be described are symmetrical from side to side, the details of construction should be readily understood. The hub (30) is seen in FIG. 5 to have a radial opening (32) which is diametrically alined with a companion hole (34) (FIG. 4), which holes have been normally used to pin the wheel to its associated or proximate shaft. In the reassembly of the wheels i journalled fashion, they are displaced axially by only about ¾″ apiece, thus indicating the compactness of the structure.

Before the wheels are replaced by journalling on their respective shafts in the change-over, other elements of the clutch-brake units are assembled. Each unit is disposed externally of the transmission case (10) and these are denoted as right and left units (36) and (38), respectively. Because only the right unit is shown in detail, the description will proceed accordingly, it being recalled that the units are symmetrical. Specific references to the left unit will be made and numbers applied where necessary to a better understanding of the disclosure.

The right unit includes a clutch drum (40), here shown as being a V-belt pulley fixed to the right shaft (24) via a diametrical pin (42). The drum is partly wrapped by a V-belt band (44) having first and second opposite ends (46) and (48) spaced angularly apart, for purposes to appear presently. The V drum and belt are preferred because of their enhancement of driving torque when engaged and further because of their known characteristics of being able to perform reliably in the most adverse conditions, such as dust, dirt, etc., peculiar to agricultural and gardening operations. Next adjacent to the drum (40) is a right brake rotor or disk (50), which is disposed between the drum and the proximate or right side of the transmission case (10). A similar brake disk is shown at (52) for the left unit. The hub of the disk (50) is journalled on the hub of the adjacent clutch drum (40). In the interests of simplicity, expensive low-friction bearings are omitted from the design.

Figure 3:
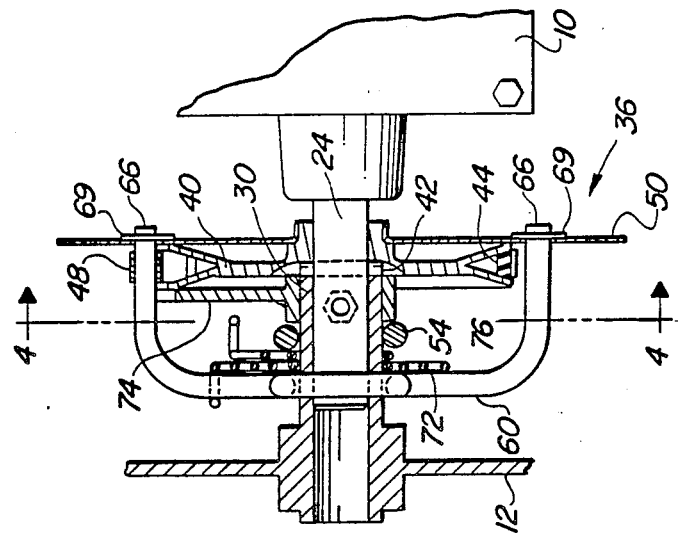
FIG. 3 is an enlarged transverse section through one of the clutch-brake units.

By way of a short statement of the operation of the clutch unit (36), the clutch drives the proximate wheel when the band is tightened. The clutch is dissengaged by retarding or stopping the associated brake disk. The following will pertain to the components involved in the foregoing operation. In this area, it should be noted that FIG. 5 shows the parts as seen looking in the same direction as the arrow on the line 4—4 on FIG. 3. The directional arrows in FIGS. 4 and 5 indicate forward rotation.

Each end of the clutch band (44) is in the form of a loop, this for the purpose of receiving connecting members. One of these is a first member (54) of "L" shape, having a radial leg (56) and an integral lateral leg (58) (FIG. 5). The inner end of this member is in the form of an eye which encircles the wheel hub (30) and thus journals the member on that hub. The lateral leg (58) projects into the looped end (46) of the clutch band. A second member (60) of dual "L" shape has a central eye (60) by means of which the member is journalled on the hub (30) and further has diametrically opposed radial legs (64) bent to form lateral legs (66). The upper of these lateral legs passes through—and thus is connected to—the band end (48) and continues through an upper opening (68) in the disk (50), while the lower lateral leg clears the band and enters the disk via a lower opening (70). The legs (66) are retained in the disk holes by cotters (69) which also serve to retain the associated wheel on its shaft. Biasing means in the form of a spiral torsion spring (72) acts on the upper legs (56) and (64) to bias the legs together and thus tightens the band on the drum for effecting normal clutch engagement and accordingly driving of the wheel (12), in this instance forwardly by means to be described below.

The drive to the wheel from the engaged clutch is in the form of a radial arm (74), here of somewhat triangular shape. The arm has hub (76) fixed to the wheel hub via locking screws (78) received in threaded holes (80) in the hub, the screws entering the wheel hub holes (32) previously described. Thus the arm (74) rotates with the wheel. When the clutch band is tightened, the lateral leg (58) of the member (54), passing through the end (48) of the band passes across the top of the drive arm (74) and, upon rotation of the clutch drum, engages the forward lug (82) on the arm so as to import driving torque to the wheel. This lug (82) is angularly spaced from a similar rear lug (84). The spring (72), moving the members (58) and (66) closer together, advances the member (66) in the gap or angular lost-motion provision between the lugs (82) and (84) (FIG. 4). Because of the connection between the legs (66) and the brake disk, the disk rotates with the parts just described.

Now, if either brake disk is held or retarded, disengagement of the associated clutch ensues, depending upon the extent to which the disk is engaged. That is, if the disk is lightly engaged, slippage of the associated clutch will follow. If the disk is gripped rather solidly, the clutch becomes totally disengaged, in either case slowing or stopping rotation of the proximate wheel.

The present invention provides alternate forms of brake control, both associated with the handlebars (18). In that form of the brake control shown in FIGS. 1 and 2, a transverse support (86) is simply bolted to the transmission case and carries at opposite ends right and left brake calipers (88) and (90). These are controlled via cables (92) and (94) operated by typical levers (96) and (98) carried at the right and left grips of the handlebars (18). Thus, the brake disks may be alternately retarded to disengage the associated clutches to steer the machine in the selected direction.

Figure 7:
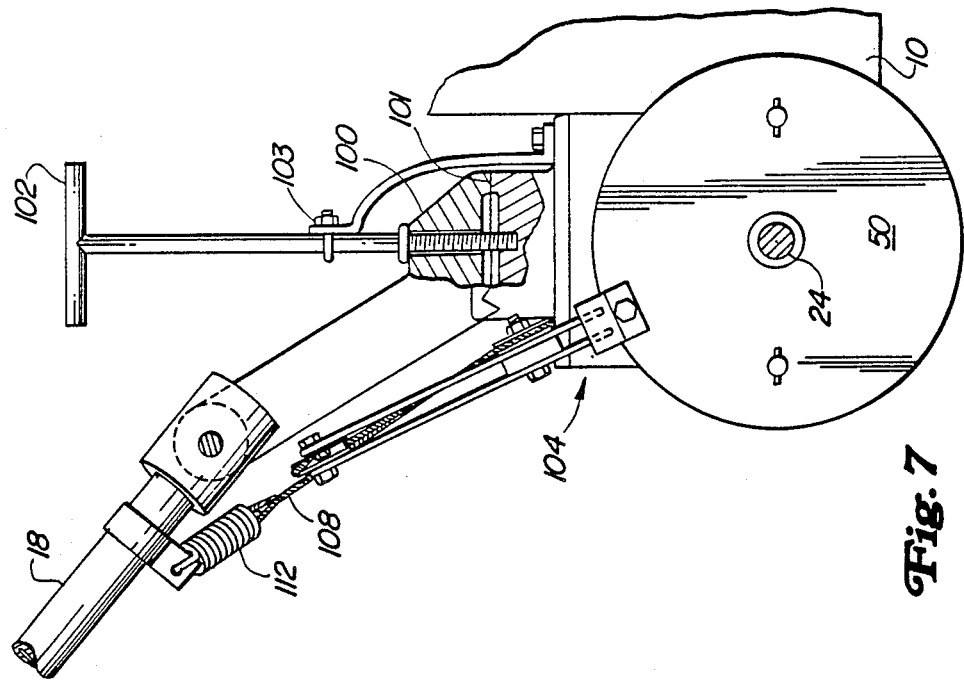
FIG. 7 is a side view, with portions broken away, of the controls of FIG. 6.
Figure 6:
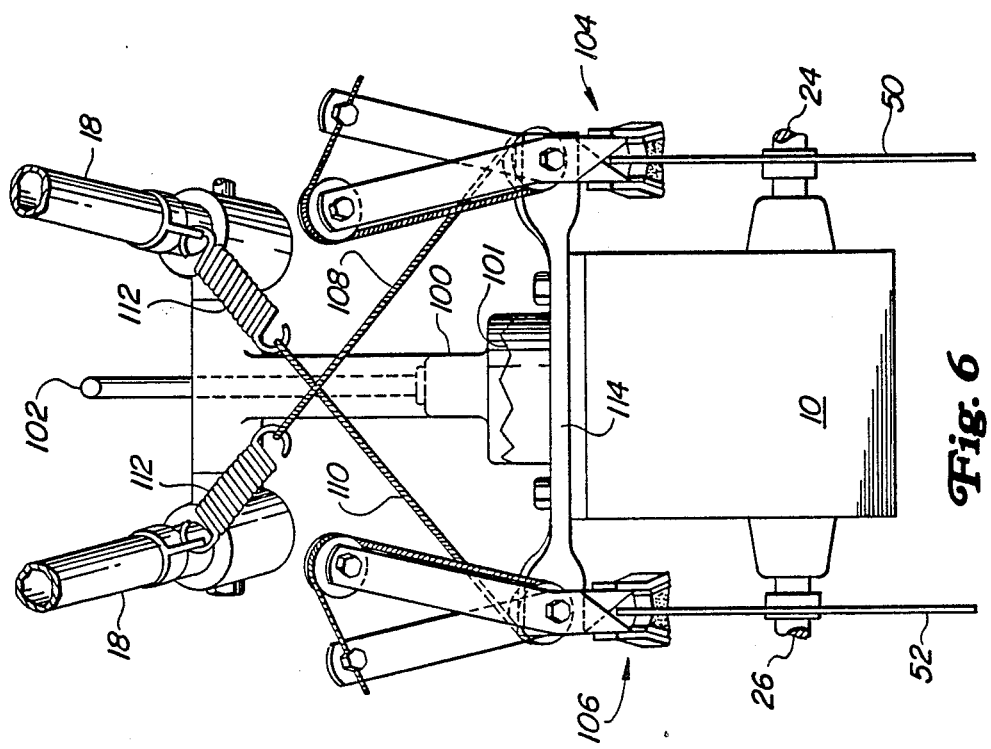
FIG. 6 is a fragmentary rear view showing another type of control for the steering units.

An alternate brake control is shown in FIGS. 6 and 7. In this case, the handlebars (18), in some machines typically attached to the transmission case by a pivotal connection (100) normally locked by toothed means (101), may be laterally adjusted from side to side to enable the attendant to walk along a path parallel to the path being operated on by the machine. To take advantage of this provision for actuating controls for the brake disks, the pivot is loosened, as by unscrewing to some extent a usual T screw member (102) so as to allow at least limited lateral swinging of the handlebars. The brake disks are selectively engaged by right and left calipers (104) and (106) via cables (108) and (110) connected between the calipers and the handlebars. Springs (112) are included in the cables to accommodate excess swinging of the handlebars. The calipers are carried at opposite ends of a cross bar or bracket (114) simply bolted to the transmission casing (10). In order to prevent loosening of the T-bolt or screw (102) after release of the connection at (100-101), a clamp (103) is provided, mounted on the transmission case and gripping the screw (102).

In the assembly and addition of the clutch-brake units to the basic machine, especially when provided in "kit" form, the wheels, as aforesaid, are first removed from their shafts. Each brake disk is placed on the hub of the associated drum and the two are slid onto the shaft and the drum pinned at (42). While the wheel is off its shaft, the members (66) and (58), with the spring (72) between them are added to the hub of the wheel, followed by the radial arm (74), which is secured to the wheel hub by the lock screws (78). In the pre-final stages of assembly, when the wheel is slid loosely onto the shaft (24), it will be necessary to temporarily spread the ends of the spring (72) apart, as by using a suitable spacer for that purpose until the band is added to the drum and the legs (58) and (66) are located between the lugs on the arm (74) and connected to the band ends and the legs (66) inserted into the brake disk and pinned at (69), following which the spacer may be removed. It will be seen that the members (54) and (60) and spring (72) are confined to the wheel hub because the arm (74) is rigid with the sleeve and the legs of the member (60) are pinned to the brake disk. With the temporary spacer removed from the spring (72), the spring, via its hooked ends, biases the legs and the ends of the bands together to tightly grip the clutch drum for driving the wheel in either direction via the legs (58) and (66) and the radial arm (74).

In forward drive, as seen in FIG. 4, the leg (58) engages the front lug (82) on the arm (74) and thus the wheel is driven forwardly because the clutch is engaged. The leg (66) in the band end (48) is spaced ahead of the rear lug (84) on the arm (74) because the spring has drawn the band ends together.

If the brake is now applied, the spring force at (72) will be reduced, since the leg (66) through the band end (48) is part of the brake and hence will retard the band end (48), loosening the grip of the band on the clutch drum and thus disengaging the clutch. The declutched wheel will now stop or at least slow down, depending upon the brake force; i.e., the clutch becomes disengaged wholly or enough to slip.

If the tiller elements or tines are operating at such speed as to tend to push the machine forwardly faster than the wheels can propel the machine, the band-engaging leg (66) will be engaged by the rear lug (84) on the arm (74), because the "over-driven" wheels will turn their arms (74) forwardly to overrun the clutches. In this condition, application of the brake will have no effect, because the tight end of the band (to the rear) is anchored by the leg (66).

Figure 8:
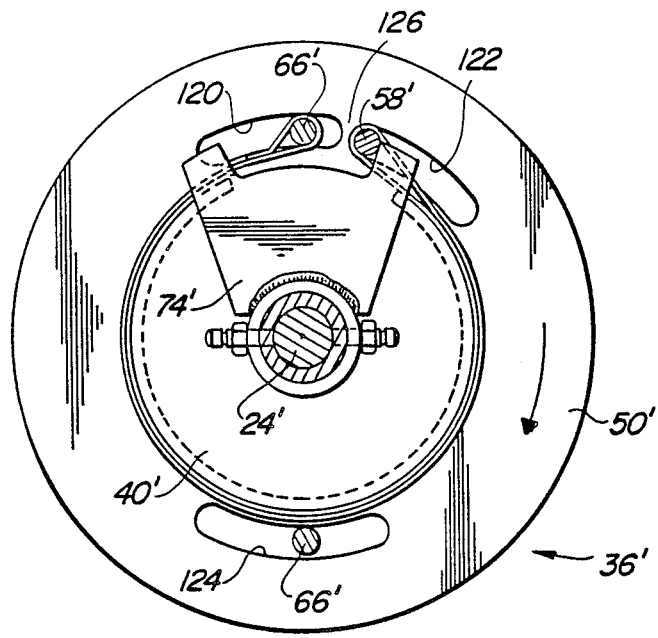
FIG. 8 is a view like FIG. 4 but shows a modified clutch-brake mechanism.

FIG. 8 shows a modified form of design that enables bi-directional control; i.e., in forward and reverse. The parts common to FIG. 8 and FIG. 4 will be recognized, and former reference numerals suffixed by (') are used. For example, it is seen that shaft (24') is included along with member (74'), drum (40'), brake disk (50') and members (58') and (66') as part of a right-hand unit (36'). In FIG. 8, the disk (50') has a pair of upper arcuate slots (120) and (122) through which, respectively, the brake band rods (66') and (58') extend. Also, the disk has a lower arcuate slot (124) through which the lower rod (66') of the member like part (60) of FIG. 4 extends. The upper slots adjoin each other at a "bridge" (126). The arrow in FIG. 8 indicates forward drive. When the clutch band is engaged, the drive is as before; i.e., member (58') engages the front lug on the member (74'). When the brake is engaged, the spring force holding the band tight will be reduced as before, thus disengaging the clutch, also as before. In reverse, the upper leg (66') engages the rear lug on the member (74') and, when the brake is applied, the band will be relaxed, the slots allowing free limited movement for this purpose.

With respect to the "kit" form of the invention, the following parameters have been observed: No basic part of the original machine is changed and any added parts are of the "bolt-on" character. The added parts are simple, low cost and the machine is not affected. Whether the inventive design is exploited as a kit or factory installation, the foregoing parameters are met, because in either case, the clutch-brake units are external to the transmission casing and no internal parts need be altered.

Features other than those pointed out herein will be readily apparent to those versed in the art, as will many modifications in the basic disclosure herein, all of which may be achieved without departure from the spirit and scope of the invention.

I claim:

1. In a self-propelled, user-guided agricultural machine adapted to travel over the ground along a line of advance and having a transmission casing including a straight-through axle structure projecting laterally outwardly from the casing as right and left driving shafts and right and left ground engaging wheels, the improvement residing in steering and driving mechanism for the machine, comprising right and left means journalling the right and left wheels respectively on the right and left shafts, right and left clutch-brake units symmetrically arranged externally of the casing, each unit disposed between a side of the casing and the proximate wheel, each further having a clutch drum coaxially rotatable with the proximate shaft, a clutch band partly surrounding the drum and having first and second opposite ends spaced angularly apart, drive means connected to the first end of the band and drivably engaging the proximate wheel, a brake rotor journalled on the proximate shaft and having a connection to the second end of the band, means biasing the ends of the band together to grip the drum and thus to drive the proximate wheel, and control means for selectively engaging and retarding each brake rotor in opposition to the biasing means for alternately relaxing the grips of the bands on the drums.

2. The improvement according to claim 1, in which each clutch drum is in the form of a V-belt sheave and each band is in the form of a portion of a complementing V-belt.

3. The improvement according to claim 1, in which each brake rotor is a disk and the control means includes right and left caliper means associated respectively with the right and left disks.

4. The improvement according to claim 1, in which each wheel has a hub extending toward but axially short of the proximate side of the transmission casing, the clutch drum is disposed between said proximate side of the casing and the proximate wheel hub, and the brake rotor is disposed between the clutch drum and said proximate side of the casing.

5. The improvement according to claim 4, in which the connection of the second end of the band to the brake rotor includes a member having a lateral portion extending over the drum and toward the proximate wheel and a conjoined portion extending radially inwardly and loosely engaging the hub of said wheel.

6. The improvement according to claim 5, including a radial arm fixed to the proximate wheel hub and having means engageable with a portion of said member.

7. The improvement according to claim 6, in which the engageable means has provision for angular lost-motion between the arm and said member portion.

8. The improvement according to claim 7, in which the radial arm has angularly spaced apart lugs between which the lateral portion of said member is loosely received whereby to provide said lost motion.

9. The improvement according to claim 5, in which the connection to the first end of the band includes a member having a portion extending radially inwardly toward and loosely engaging the wheel hub and the biasing means acts between that radial portion and the radial portion of the member connected to the second end of the band.

10. The improvement according to claim 9, in which the biasing means is a spiral torsion spring.

11. The improvement according to claim 9, in which the radially inward portion of the member connected to the first end of the band loosely encircles the wheel hub.

12. The improvement according to claim 5, in which the radial portion of said member loosely encircles the proximate wheel hub.

13. The improvement according to claim 4, in which each wheel has an inboard side spaced axially from and facing the proximate side of the casing, the proximate clutch drum is disposed between the side of the casing and the inboard side of the proximate wheel, the brake rotor is disposed between the proximate drum and proximate side of the casing, the drive means connected to the first end of the associated band is a first L-shaped member having a radial leg journalled on the inboard side of the proximate wheel and a lateral leg rigid with the radial leg and engaged with the first end of the proximate band, the connection of the second band includes a second member having an L-shaped part including a radial leg journalled on the inboard side of the proximate wheel and a rigid lateral leg extending to and engaged with the second end of the proximate band, and the biasing means acts between the two radial legs.

14. The improvement according to claim 13, in which the second member has a further L-shaped part including a leg formed as a rigid diametrical extension of the radial leg of the second member and a rigid lateral extension clear of the drum and band and engaging the brake rotor.

15. The improvement according to claim 1, including bi-directional lost-motion means embodied in the connection of each band to the brake rotor.

16. The improvement according to claim 15, in which the brake rotor is a disk and each lost-motion means includes a slot in the disk and a band-end-connection member projecting through the respective slot.

17. In a self-propelled, user-guided agricultural machine adapted to travel over the ground along a line of advance and having a transmission casing including a straight-through axle structure projecting laterally outwardly from the casing as right and left driving shafts and right and left ground engaging wheels, the improvement residing in steering and driving mechanism for the machine, comprising right and left means journalling the right and left wheels respectively on the right and left shafts, right and left clutch-brake units symmetrically arranged externally of the casing, each unit disposed between a side of the casing and the proximate wheel, each further having a clutch drum coaxially rotatable with the proximate shaft, a clutch band partly surrounding the drum and having first and second opposite ends spaced angularly apart, a torque arm fixed to the proximate wheel between the wheel and the proximate clutch drum, said arm having a pair of angularly spaced apart lugs rigid thereon, a brake rotor journalled on the shaft between the proximate drum and the adjacent side of the casing, a first lateral member engaging the first end of the proximate band and extending between the lugs, a second lateral member connected to the proximate brake rotor and extending laterally to and between the lugs on the proximate radial arm and further engaging the second end of the proximate band, means biasing the member toward each other to tighten the grip of the band on its clutch, and control means for selectively engaging and retarding the brake rotors in opposition to the biasing means for alternately relaxing the grips of the bands on the drums.

* * * * *

UNITED STATES PATENT AND TRADEMARK OFFICE
CERTIFICATE OF CORRECTION

PATENT NO. : 4,895,210

DATED : January 23, 1990

INVENTOR(S) : Homer D. Witzel

It is certified that error appears in the above-identified patent and that said Letters Patent is hereby corrected as shown below:

Column 2, line 68 "i" should be --in--.

Column 4, line 8 "import" should be --impart--.

Column 6, line 29 the second "the" should be --each--.

Column 8, line 20 after the word "each" insert --unit--.

Column 8, line 34 "the member" should read --the first and second lateral members--.

Column 8, line 35 "its clutch" should read --its respective clutch drum--.

Signed and Sealed this

Twenty-second Day of January, 1991

Attest:

HARRY F. MANBECK, JR.

Attesting Officer

Commissioner of Patents and Trademarks